United States Patent [19]

Graser, Jr. et al.

[11] 4,003,634
[45] Jan. 18, 1977

[54] OPTICAL CONTROL ASSEMBLY FOR A COLOR DESIGN VIEWER

[75] Inventors: Michael Graser, Jr., Bedford; Vincent Francis Bilotta, Norwood, both of Mass.

[73] Assignee: Technical Operations Incorporated, Boston, Mass.

[22] Filed: Aug. 12, 1974

[21] Appl. No.: 496,634

[52] U.S. Cl. .................. 350/162 SF; 350/96 B; 350/171
[51] Int. Cl.² ................ G02B 27/14; G02B 27/38
[58] Field of Search .......... 350/162 SF, 171, 172, 350/96 B; 358/5, 44, 47; 355/37, 1; 353/31, 20, 85

[56] References Cited

UNITED STATES PATENTS

| | | | |
|---|---|---|---|
| 1,456,427 | 5/1923 | De Procoudine-Gorsky | 350/171 |
| 2,604,813 | 7/1952 | Gretener | 350/166 X |
| 3,549,238 | 12/1970 | Graser | 350/162 SF |
| 3,761,156 | 9/1973 | Mohon et al. | 350/3.5 |
| 3,884,553 | 5/1975 | Graser | 350/162 SF |

*Primary Examiner*—Ronald J. Stern
*Attorney, Agent, or Firm*—Alfred H. Rosen; Frank A. Steinhilper

[57] ABSTRACT

An optical apparatus using a single source of white light has five independent channels each of which divides that light into three spectral components, and supplies those components individually through individual attenuators for use as a set of fifteen separate and independently-controllable light sources. Fiber optics light conductors bring light from those sources to a transform filter in a Fourier transform optical system.

13 Claims, 10 Drawing Figures

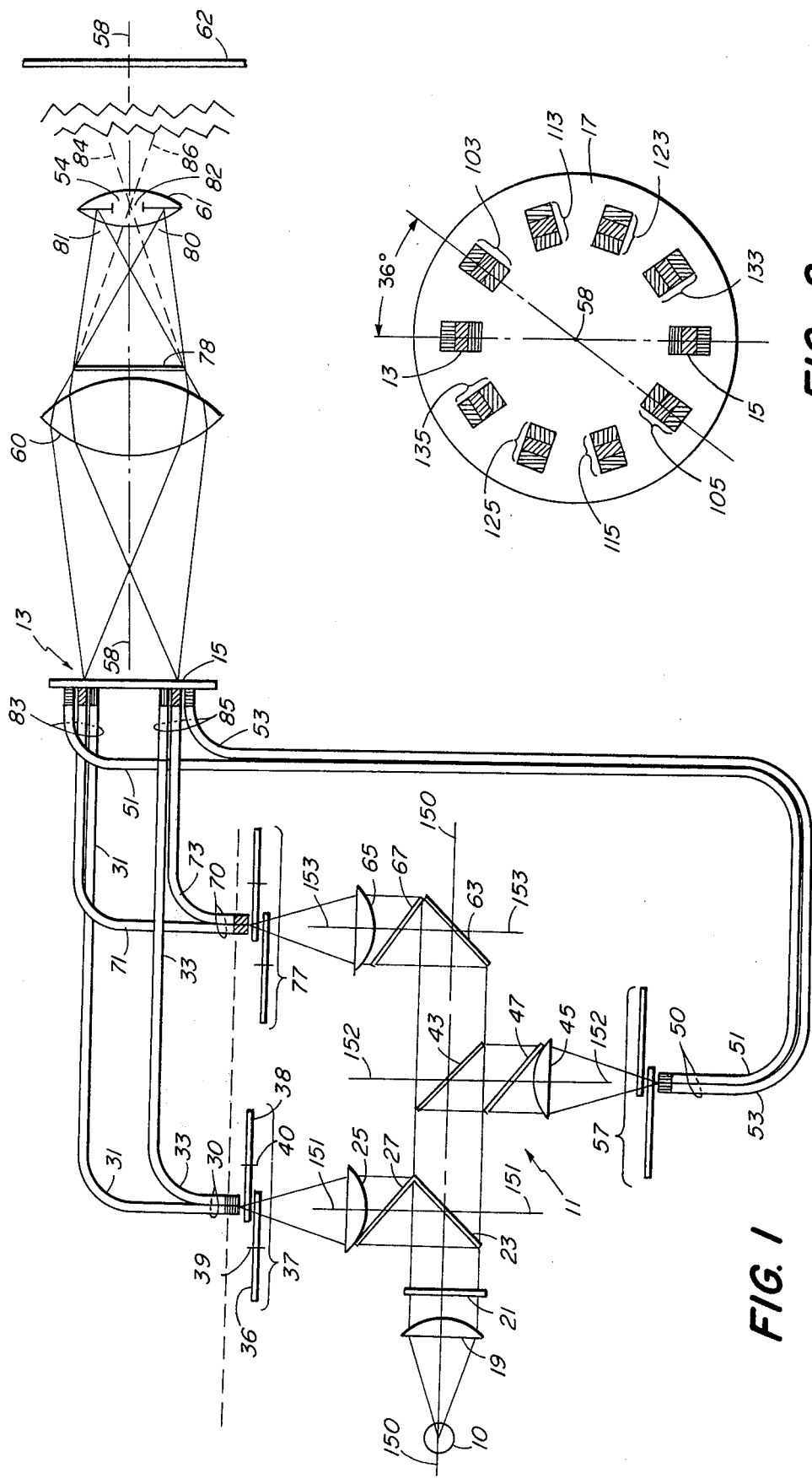

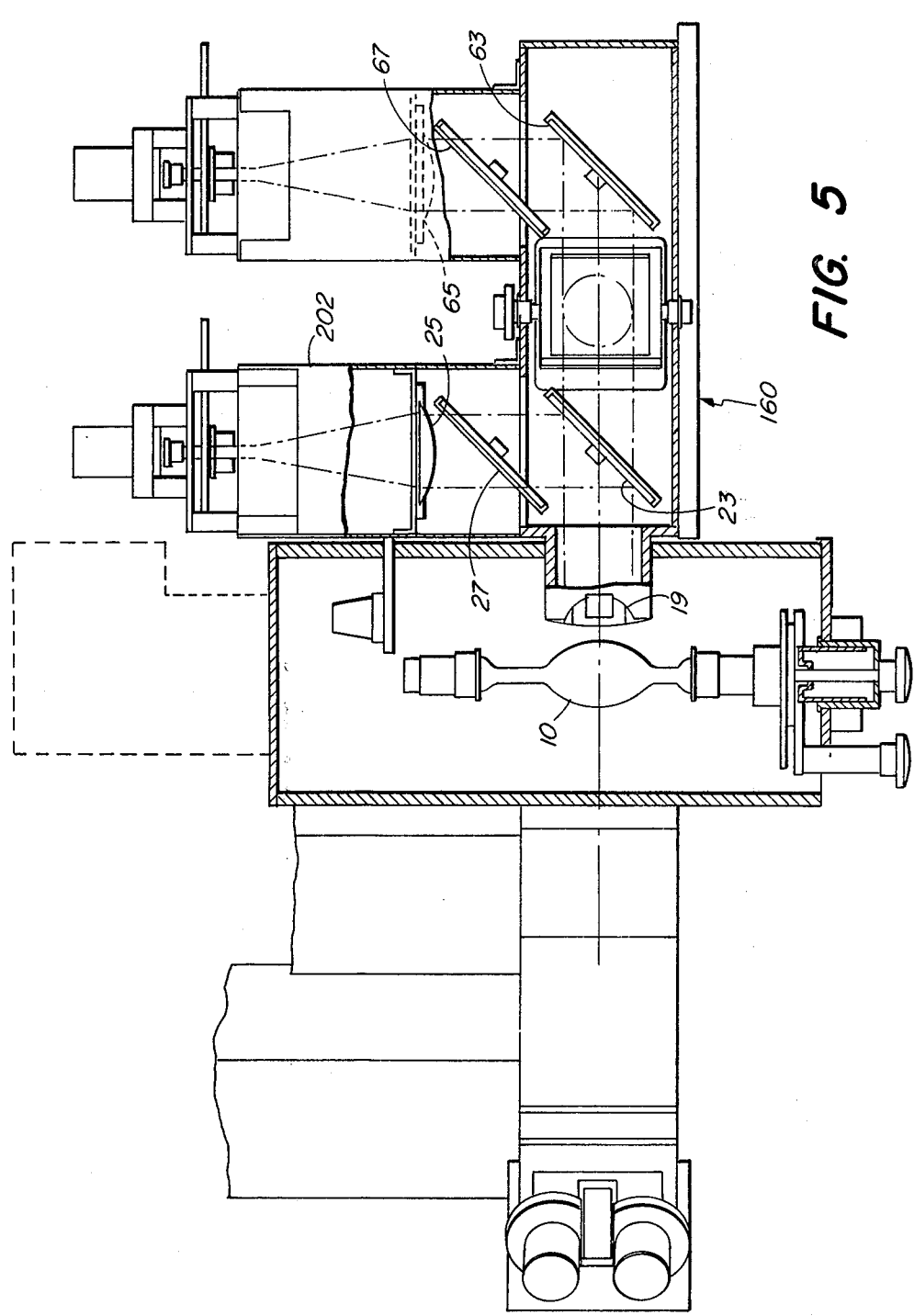

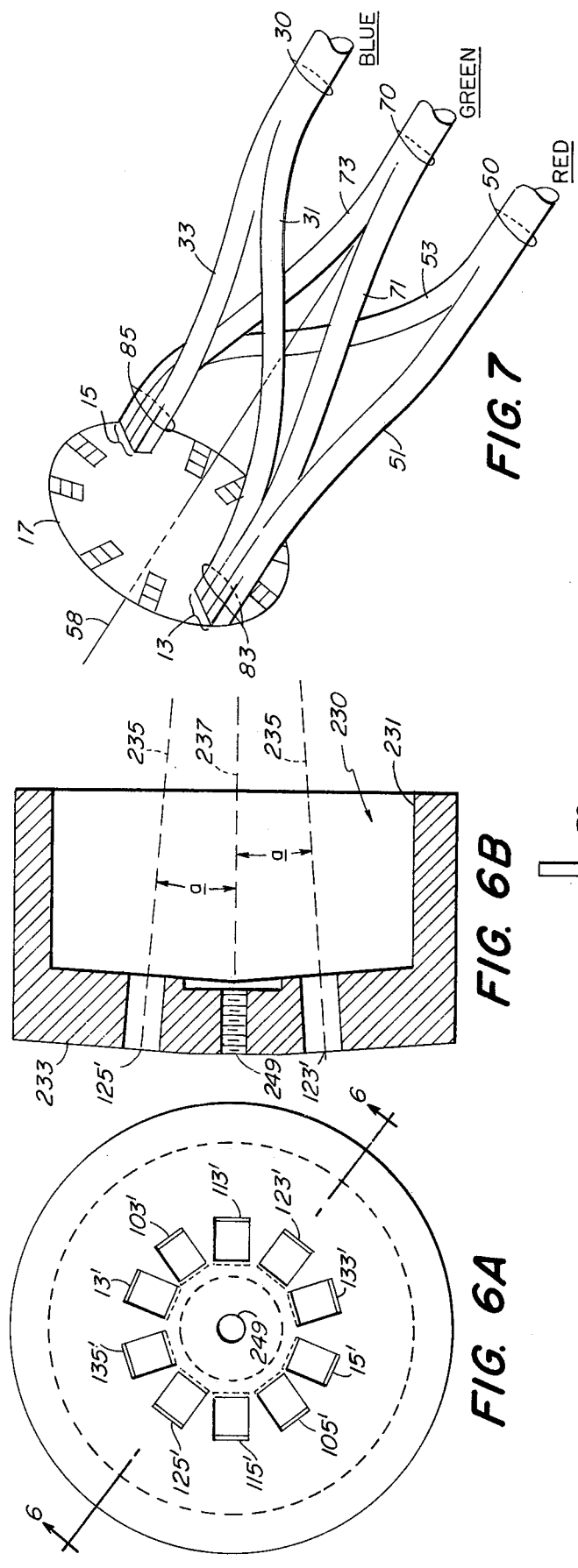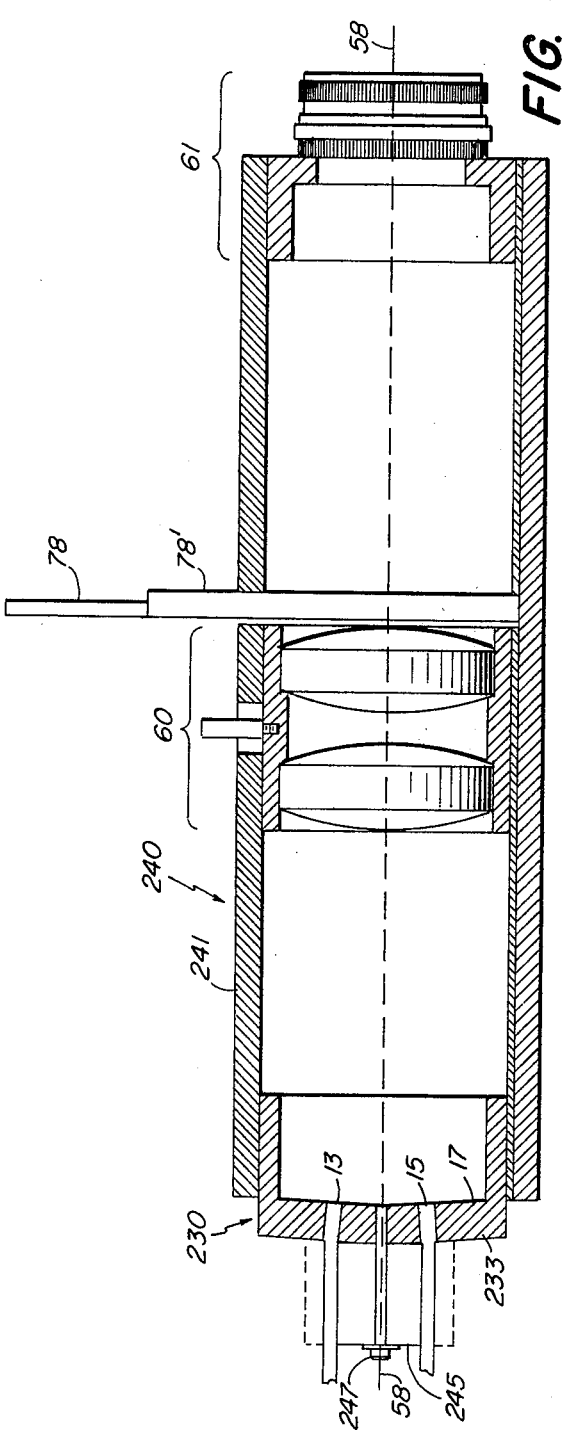

OPTICAL CONTROL ASSEMBLY FOR A COLOR DESIGN VIEWER

CROSS-REFERENCE TO RELATED PATENTS

This invention relates generally to optical image reconstruction apparatus of the kind that is described in U.S. Pat. Nos. 3,561,859 and 3,549,238, and may incorporate the improvement of application Ser. No. 433,903 filed Jan. 16, 1974, now U.S. Pat. No. 3,884,553, all of which are owned by the assignee of the present application. It relates more particularly to apparatus that is useful to perform methods and to construct colored images from records that are described and claimed in application Ser. No. 399,367 filed Sept. 21, 1973, now U.S. Pat. No. 3,947,105. Generally, such apparatus comprises an optical viewing or display apparatus having an optical axis, means for supporting on the axis a record of one or more component record images each modulating a spatial carrier characterized by a unique orientation relative to the carriers of the other components, and light-source means for illuminating the record with light beams effectively emanating from a plurality of angularly separated sources, there being one or a pair of such effective light sources for each of said component record images. The source or pair of sources for each such component is or are angled obliquely to the axis, and aligned azimuthally with respect to the carrier orientation of said such component, so as to locate a predetermined harmonic diffraction spectrum of said component on the optical axis in a Fourier transform space.

BACKGROUND OF THE INVENTION

The diffraction angle of a grating is proportional to the wavelength of the light that is used to illuminate it. Thus, red light is diffracted further (i.e.: angularly more) than blue light. If diffracted light must fall on the optical axis, the source of red light has to be displaced further off-axis than the source of blue light, for example. The referenced patents recognize this fact, and the solution taught in them is to locate light sources of different colors at different azimuthal orientations and at different radial displacements from the optical axis of the image reconstruction apparatus. For effective production of a plurality of angularly-separated light sources the referenced patents show a module for providing a plurality of light channels from a single principal source of light. Each channel is coupled to the principal light source when present via a respective intermediate optical system, and those systems are all carried in a turret having in it the location for the main light source. Each of the intermediate optical systems extends on an axis that is oriented radially away from that location and couples remotely to a preferably flexible light conductor, which may be made of optical fibers, and which brings a component of the light to a location for use as one of the light sources in the reconstruction apparatus. The present invention relates primarily to the provision of an improved light-generating module which incorporates techniques and structures that are in part shown but not claimed in the above-referenced application Ser. No. 433,903 filed Jan. 16, 1974.

BRIEF DESCRIPTION OF THE DRAWINGS

FIG. 1 is an optical schematic illustrating the layout of one optical channel in a light-generating module according to the invention;

FIG. 2 schematically illustrates the layout of the transform filter used in FIG. 1;

FIG. 5 is a vertical section along line 5—5 of FIG. 4;

FIGS. 6A and 6B are respectively a top view and an axial section of a transform filter;

FIG. 7 is a fragmentary schematic illustration of a mode of coupling light conductors from one channel of the turret to the transform filter; and FIG. 8 is a section through a Fourier transform image reconstructing arrangement with which the invention is intended to be used.

DETAILED DESCRIPTION OF THE DRAWINGS

Figure 3:
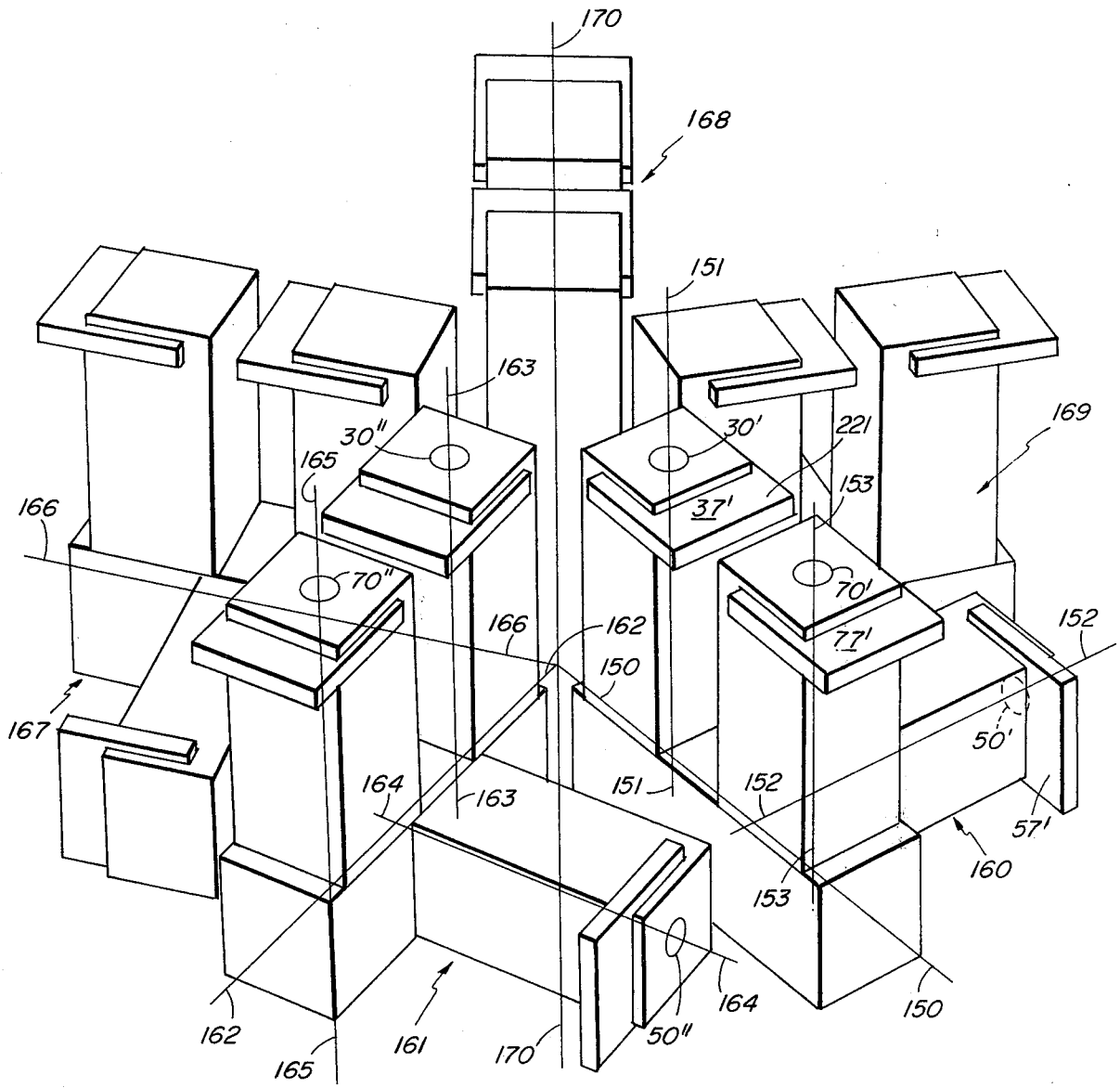
FIG. 3 is a mechanical layout of a turret of optical systems for several optical channels.

In FIG. 1 a single optical subassembly 11 provides a source of red, green and blue light components to a pair of diametrically-opposed off-axis light sources 13 and 15, respectively, located in a transform filter 17 of a reconstruction apparatus of the kind described in the referenced patents. The optical axis of the reconstruction apparatus is along line 58—58. White light from the principal light source lamp 10, passes through a condenser lens 19 and a heat filter 21 to a first spectral filter 23 (preferably dichroic) which reflects blue light to a second condenser lens 25 through a blue trim filter 27. The first and second condenser lenses 19 and 25 form a first condenser system for focusing the blue light component on a first bundle 30 of two light conductors 31 and 33 through a neutral-density variable light attenuator 37. The two light conductors 31 and 33 may be grouped side-by-side as shown, or may be random-mixed at the bundle 30. The attenuator in this example is shown as a pair of discs 36 and 38 each rotatable on a shaft 39, 40, respectively. Conveniently, one disc 36 is calibrated in ten "units" of attenuation for a complete revoluton while the other 38 is calibrated in steps each of which is equal to ten units of the first so as to change its attenuation factor in steps of ten "units" each.

Light that passes through the first spectral filter 23 next encounters a second spectral filter 43 which reflects red light to a third condenser lens 45 through a red trim filter 47. The first and third condenser lenses 19 and 45 form a second condenser system for focusing the red light component on a second bundle 50 of two light conductors 51 and 53 through a neutral-density variable light attenuator 57.

Light that passes through the second spectral filter 43 next encounters mirror, preferably incorporating a third spectral filter 63, which reflects green light to a fourth condenser lens 65 through a green trim filter 67. The first and fourth condenser lenses 19 and 65 form a third condenser system for focusing the green light component on a third bundle 70 of two light conductors 71 and 73 through a neutral-density variable light attenuator 77. The second and third bundles 50 and 70 can also be made of side-by-side or random-mixed groupings of fibers.

A first blue light conductor 31, a first green light conductor 71 and a first red light conductor 51 are brought together in a first trifurcated bundle 83 to form a first one 13 of the pair of off-axis light sources 13, 15. A second blue light conductor 33, and a second green light conductor 73 and a second red light conductor 53 are brought together in a second trifurcated bundle 85 to form the second one 15 of these two off-axis light sources. This is more fully illustrated in FIG. 7.

Each off-axis light source 13, 15 in the illustrated diametrically-opposed pair is located in the transform filter assembly 17 so as to deposit a first-order (or other desired-order) diffraction spectrum in the aperture stop 54 of the reconstruction apparatus when used to demodulate a modulated image stored in a suitable record 78, provided the record contains modulation which bears the proper azimuthal orientation for both sources and has appropriate spatial periodicity. The reconstruction apparatus includes as components known from the referenced patents a transform lens 60, a projection lens 61, the aperture stop 54 and a screen 62 for displaying a real image. The record 78 bearing a spatially-modulated stored image may be located on the far side of the transform lens from the transform filter. It is assumed for the purposes of this illustration (i.e.: in FIG. 1) that the record 78 bears a diffraction grating modulation the lines of which are directed normal to the drawing. With this arrangement, as is known, zero-order diffracted light from each light source 13, 15 will be directed to fall outside the aperture of the stop 54, for example at a position 80, 81, respectively, and a first-order diffraction pattern from each source 13, 15 will fall in the stop 54 at a region 82 as is represented by dashed lines 84, 86.

Using the arrangement shown in FIG. 1, several optical subassemblies, for example, five like the one shown, can be arrayed around the lamp 10, to provide four additional pairs of diametrically-opposed off-axis light sources, 103, 105; 113, 115; 123, 125; and 133, 135; arrayed around the optical axis 58 in the transform filter assembly 17, as is shown in FIG. 2. Each such pair will constitute the input light to a separate optical channel, and can be used to illuminate a uniquely spatially-modulated record image; and each uniquely-modulated image can be illuminated and reconstructed separately or simultaneously with one or more of the others. Each such light source can be spaced azimuthally the same amount from its neighbors, in which case the angle between adjacent pairs of light sources will be 36°, in the illustrated example. Advantageously, according to the invention of the above-referenced application Ser. No. 433,903 filed Jan. 16, 1974, each light source in the transform filter 17 for the reconstruction system is comprised of a radially-distributed array of colored light sources. An array of three colored sources — red, green and blue, with the red located radially furthest from the optical axis 58 and the blue nearest to the axis — is a preferred example. This array is fixed relative to the optical axis, each color being uniquely located as determined by the diffraction grating spatial periodicity in the record 78 and optical parameters of the reconstruction apparatus. A trifurcated bundle (e.g.: 83, 85) of fiber optics conductors (see FIG. 7) with its ends providing the light sources having respective rectangular cross-sections, has been found to be efficient and convenient for packing colored light sources closely together in the radial direction. The input ends of such a trifurcated bundle which receive the individually colored light inputs are physically separate from each other, so that each may be coupled to a separate source of spectrally-filtered light, as appears in both FIGS. 1 and 7. Using this technique, a plurality of off-axis light sources are provided, each of which can be made to provide light of any desired hue or color at an optimum radial distance from the optical axis 58, 58 of the modulated-image reconstruction system employing them. Neutral density filters (e.g.: 37, 57, 77) are employed to attenuate to any desired degree the light of any one or more spectral components of each individual off-axis light source.

In FIG. 1, light from the principal source 10 is taken into the optical subassembly 11 along a principal axis 150—150, and the light of each spectral component is taken along a component axis 151—151; 152—152 or 153—153 which is perpendicular to the principal axis. Conveniently, the intermediate component axis 152—152 is also perpendicular to the first and third component axes 151—151 and 153—153, as is shown in FIG. 3, which illustrates an arrangement of a turret of five optical subassemblies 160, 161, 167, 168 and 169 about the axis 170—170 on which the principal light source 10 (not shown) is located when present therein. The first of these subassemblies 160 corresponds to the subassembly 11 shown in FIG. 1, and the principal and component axes 150, 151, 152 and 153 are indicated on both. Each component axis lies in a plane (not shown) that is perpendicular to the principal axis, and spaced from the other planes along that axis. The intermediate component axis 152—152 for the red component light is shown perpendicular to both the principal axis 150—150 and to the blue and green component axes 151—151 and 153—153, respectively.

The principal axes 150—150; 162—162; 166—166, etc., of all the subassemblies intersect each other on the turret axis 170—170, to which they are all perpendicular, and from which they each extend radially. The principal and component axes 162—162; 163—163; 164—164 and 165—165 of the second subassembly 161 are indicated for reference, and it will be apparent that the blue and green component axes of all the subassemblies extend in the same direction from their respective principal axes, parallel to the turret axis 170—170, while the red component axes of all the subassemblies extend in the same direction from their respective principal axes, perpendicular to all the other axes. The resulting physical configuration is both compact, and provides easy access for the coupling of flexible light conductors to each spectral component of each subassembly. Thus, referring to the first subassembly 160, the neutral density filters 37, 57 and 77 of FIG. 1 will be located at 37', 57' and 77', while the fiber-optics bundles 30, 50 and 70 can be coupled at 30', 50' and 70'. Similar coupling locations are indicated on the second subassembly 161 at 30'', 50'' and 70''. It will be noted that access to the red component (50'; 50'') is as easy as to the blue and green components, and at the same time this turret enjoys an economy of space and size. The turret axis 170—170 is in a generally hollow cylindrical location that is readily accessible at both ends, so that the installation of a principal light source 10 will not be impeded by the turret structure.

Figure 4:
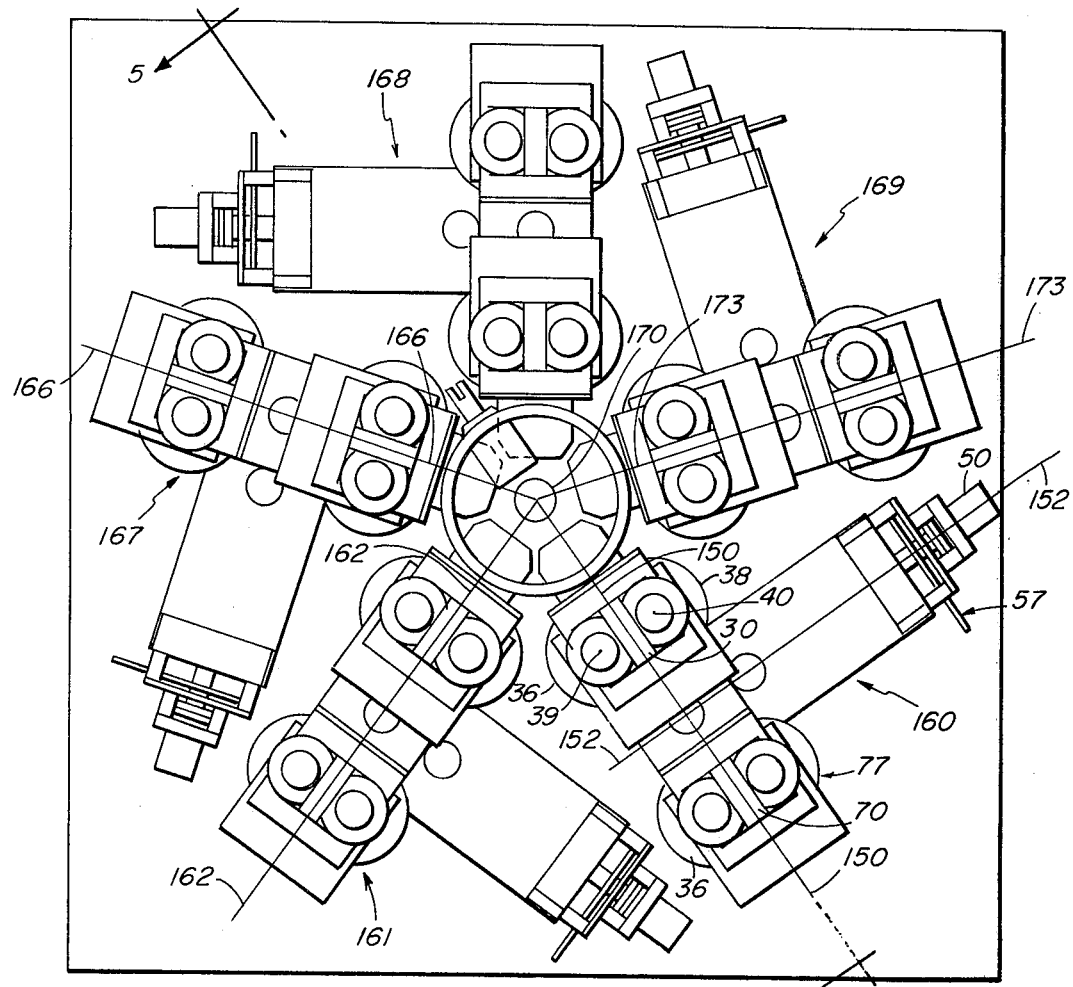
FIG. 4 is a top view of a turret laid out according to FIG. 3.
Figure 4A:
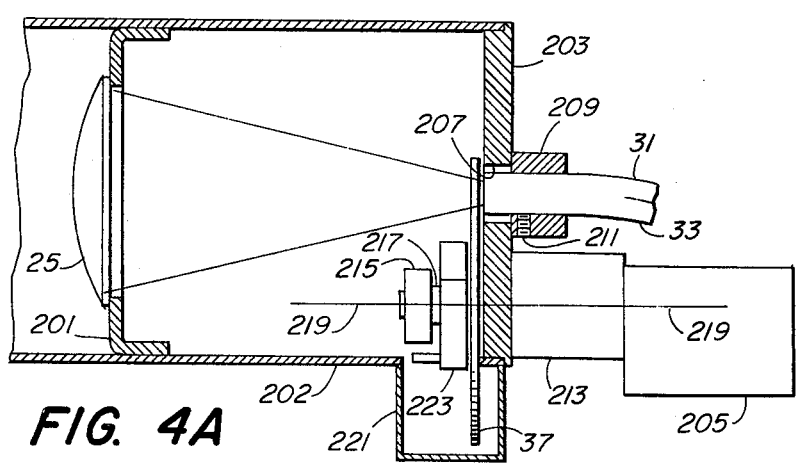
FIG. 4A illustrates a modified detail of FIG. 4.

FIG. 4 illustrates in outline form some of the structural details that may be incorporated in an arrangement of components according to FIG. 3. For example, in the first sub-assembly 160 two N.D. filter discs 36, 38 on axes 39, 40, as in FIG. 1, are shown for each light channel, illustrating that room is provided to incorporate two driving motors per channel for the light attenuators. FIG. 4A, which is an enlarged view of the output end of the blue channel in the first subassembly, also illustrates the option of using a single N.D. filter disc in the attenuator 37. In that figure, the second lens 25 of the blue channel is shown in its structural supports 201, 202, the latter being a tubular support mounting an end plate 203 which holds the light conductors 31 and 33 and a driving motor 205 for the attenuator. The end plate 203 has an aperture 207 through which the light conductors receive light from the lens 25. A boss 209 holds the light conductors, and a screw 211 is used to clamp them in place in the boss. A base 213 for the motor is mounted on the outer surface of the end plate 203 and the motor shaft 217 extends on an axis 219—219 through the base and the end plate into the tubular support 202 where the attenuator 37 is mounted on the shaft by means of a retainer 215. A housing 221 extends from a side of the tubular support 202 to protect the attenuator from damage. FIG. 3 schematically illustrates such extending housings, where only 221 is referenced. The additional part 223 on the shaft 217 is available for signalling purposes.

FIG. 5 is a fragmentary view taken on line 5—5 of FIG. 4, intended primarily to illustrate the cooperating relation between the lamp 10 and one of the subassemblies 160, as an example. Only a few of the parts have been given reference characters, in the blue and green channels. It will be observed that the trim filters 27 and 67 in these channels can be set at various angles, as may be desired, comparing FIGS. 1 and 5. Details of mounting and supplying power to the lamp 10 are not described because they do not form part of the invention. It is sufficient to note that the lamp is preferably a source of white light, such as a Xenon lamp.

FIGS. 6A and 6B show structural details of a practical embodiment of the transform filter 17. For rigidity, a single body 230 having cylindrical side walls 231 and a relatively more massive end wall 233 is used. An array of bores 13', 15'; 103', 105'; 113', 115'; 123', 125'; and 133', 135'; each of rectangular cross section, is provided in the end wall 233, for receiving in each aperture, respectively, the light conductors of the correspondingly referenced light sources shown in FIG. 2. As is shown in FIG. 6B, the axis 235 of each bore is directed an at angle $a$ to the axis 237 of the cylinder having the side walls 231. This angle $a$ is chosen so that the cones of light from the fiber optics bundles all overlap at the record 78 to provide uniform illumination of the record, as appears in FIG. 8.

The Fourier transform optical system is generally supported in a rigid tubular structure 240 having side walls 241 in which are supported a transform lens assembly 60, a holder 78' for the record 78, and at one end a projection lens assembly 61. The supporting body 230 of the transform filter 17 is mounted in the other end of the tubular structure 240, and it is apparent that its cylinder axis 237 coincides with the optical axis 58—58 of the Fourier transform optical system. The light conductors of the various light sources (13 and 15 are shown in FIG. 8) are held on the end wall 233 in a boss 245 which is fastened to the end wall with a bolt 247 engaged in the threaded bore 249 (FIG. 6B).

The system herein illustrated provides 15 individual sources of colored light from five individual subassemblies of light collector lenses. Alternatively, one might provide according to the prior art an individual subassembly of light collector lenses for each of the 15 sources of colored light, that is, 15 individual subassemblies of collector lenses. In a comparative study of the present system and such a prior art system it was found that the overall light efficiency of the present system was as much as 45% better in the color channel (blue) nearest the principal light source 10, and about 30% better in the color channel (red) next farthest removed from the principal light source.

While the present disclosure has shown structural details for assembling the numerous components of the invention, with some alternative choices being indicated, it should be understood that the invention is not limited to those details, and that many more alternatives will occur to those skilled in the art to which the invention relates. In general it is desirable that the dichroic beam splitter filters be adjustable for tilt to provide optimum focus onto the light receiving ends of the light conductors. The color trim filters should also be adjustable for tilt to obtain maximum light transfer at the desired wavelength.

We claim:
1. An optical apparatus incorporating a plurality of cooperating subsystems for providing with each subsystem a plurality of spectrally-unique light components from a source of light having spectral bandwidth encompassing all of said components, comprising means to direct light from such a source when present in a principal path that is unique to one only of said subsystems to a plurality of spectral selection means arranged sequentially in said principal path for deriving said components from said source of light, and means to direct each component substantially perpendicularly away from said principal path on a unique path that is substantially normal to said principal path and is separated from the paths of the remaining components, each of said subsystems having three spectral components, the unique paths of the first and third components along said principal path extending in a first direction, and the unique path of the component that is between said first and third extending in a second direction that is substantially perpendicular to said first direction, said subsystems being arrayed about the location of said source when present so that their respective principal paths extend radially in different directions from said location substantially perpendicular to an axis passing through said location, the unique paths of the first and third components in each said subsystem being oriented substantially parallel to said axis.

2. An optical apparatus according to claim 1 in a Fourier transform optical device for reconstructing on an optical axis an image from a record of that image having several components each of which is multiplied with a spatially-periodic modulation having a unique orientation in the record, said device using a plurality of spectrally-unique light source means arrayed about said axis each in a unique location at a prescribed offset distance from said axis for cooperating with one such modulation, wherein each of said utilization locations is coincident with the location of a prescribed one of said light source means, and wherein a unique light guiding means is provided for coupling light from each of said unique paths to a prescribed one of said unique locations.

3. An optical apparatus according to claim 1 comprising in each of said subsystems, at least a first condenser lens disposed on a first optical axis, a second condenser lens disposed on a second optical axis angularly related to and intersecting the first optical axis at a first intersection point, a first light reflector which is partially transparent located substantially at the first intersection point to reflect light in a first path between said first and second lenses along said first and second axes; a third condenser lens disposed on a third optical axis angularly related to and intersecting said first optical axis at a second intersection point further from said first lens than the first intersection point, and a second light reflector located substantially at the second intersection point to reflect light in a second path between said first and third lenses through said first reflector along said first and third axes, whereby to transpose light from a first location on said first axis to second and third physically separated locations on said second and third axes, respectively.

4. Apparatus according to claim 3 including means in said first path to limit light at said second location to a first spectral zone, and means in said second path to limit light at said third location to a second spectral zone.

5. Apparatus according to claim 4 wherein said first reflector includes a first dichroic filter to reflect light of said first spectral zone to said second location and to pass light of said second spectral zone to said second reflector.

6. Apparatus according to claim 3 including a separately adjustable neutral density filter means located to attenuate light exiting each of said second and third locations.

7. Apparatus according to claim 3 including first fiber optics light conductor means having an input end located in the vicinity of said second location to receive light exiting said second location, and second fiber optics light conductor means having an input end located in the vicinity of said third location to receive light exiting said third location.

8. Apparatus according to claim 3 wherein said second and third axes are located in respective spaced-apart planes that are parallel to each other.

9. Apparatus according to claim 3 including in each of said subsystems a fourth condenser lens disposed on a fourth optical axis angularly related to and intersecting said first optical axis at a third intersection point further removed from said first lens than said second intersection point, wherein said second reflector is partially transparent, and a third light reflector located substantially at said third intersection point to reflect light in a third path between said first and fourth lenses through said first and second reflectors along said first and fourth axes, whereby to transpose light from a first location on said first axis to second, third and fourth physically separated locations on said second, third and fourth axes, respectively.

10. Apparatus according to claim 9 wherein said first reflector includes a first dichroic filter for reflecting to said second location light of a first spectral zone and passing other light, and said second reflector includes a second dichroic filter for reflecting to said third location light of a second spectral zone and passing other light, whereby to separate white light at said first location into first, second and third different spectral components at said second, third and fourth locations, respectively.

11. Apparatus according to claim 9 in which said second, third and fourth axes are located in respective spaced-apart planes that are parallel to each other, one of said second, third and fourth axes being substantially perpendicular to the other two.

12. Apparatus according to claim 9 including first fiber optics light conductor means having an input end located in the vicinity of said second location to receive light of said first spectral component, second fiber optics light conductor means having an input end located in the vicinity of said third location to receive light of said second spectral component, and third fiber optics light conductor means having an input end located in the vicinity of said fourth location to receive light of said third spectral component, each of said light conductor means having an output end, and means to bring said output ends together at a utilization location for supplying at said utilization location any one or combination of said spectral components.

13. Apparatus according to claim 12 including a separately adjustable neutral density filter means located between each of said input ends and said respective second, third and fourth locations, and means to adjust each of said neutral density filter means independently of the others, whereby to select the intensity of each of said spectral components at said utilization location.

* * * * *